April 15, 1930.  M. G. CLARK ET AL  1,755,101
DISHWASHER
Filed Dec. 16, 1921   3 Sheets-Sheet 2
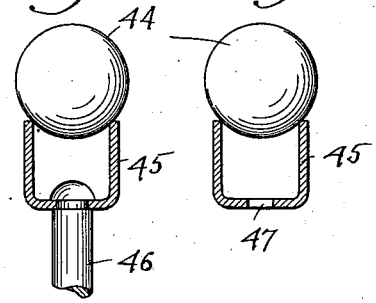
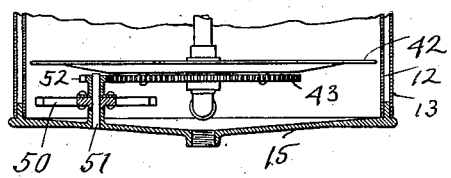
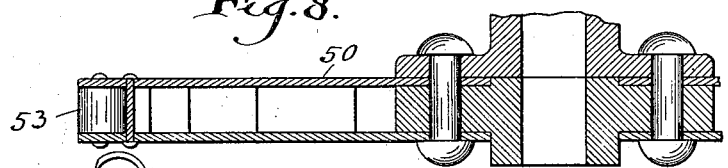
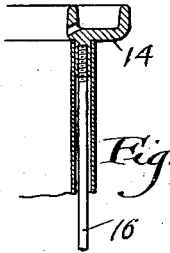
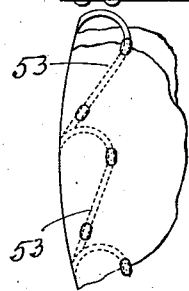
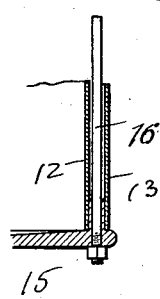
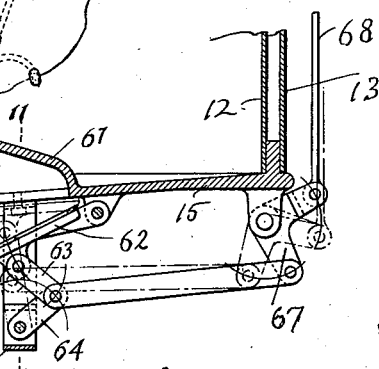
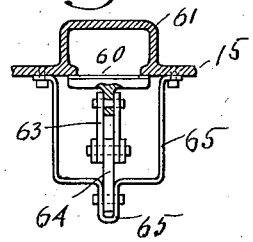

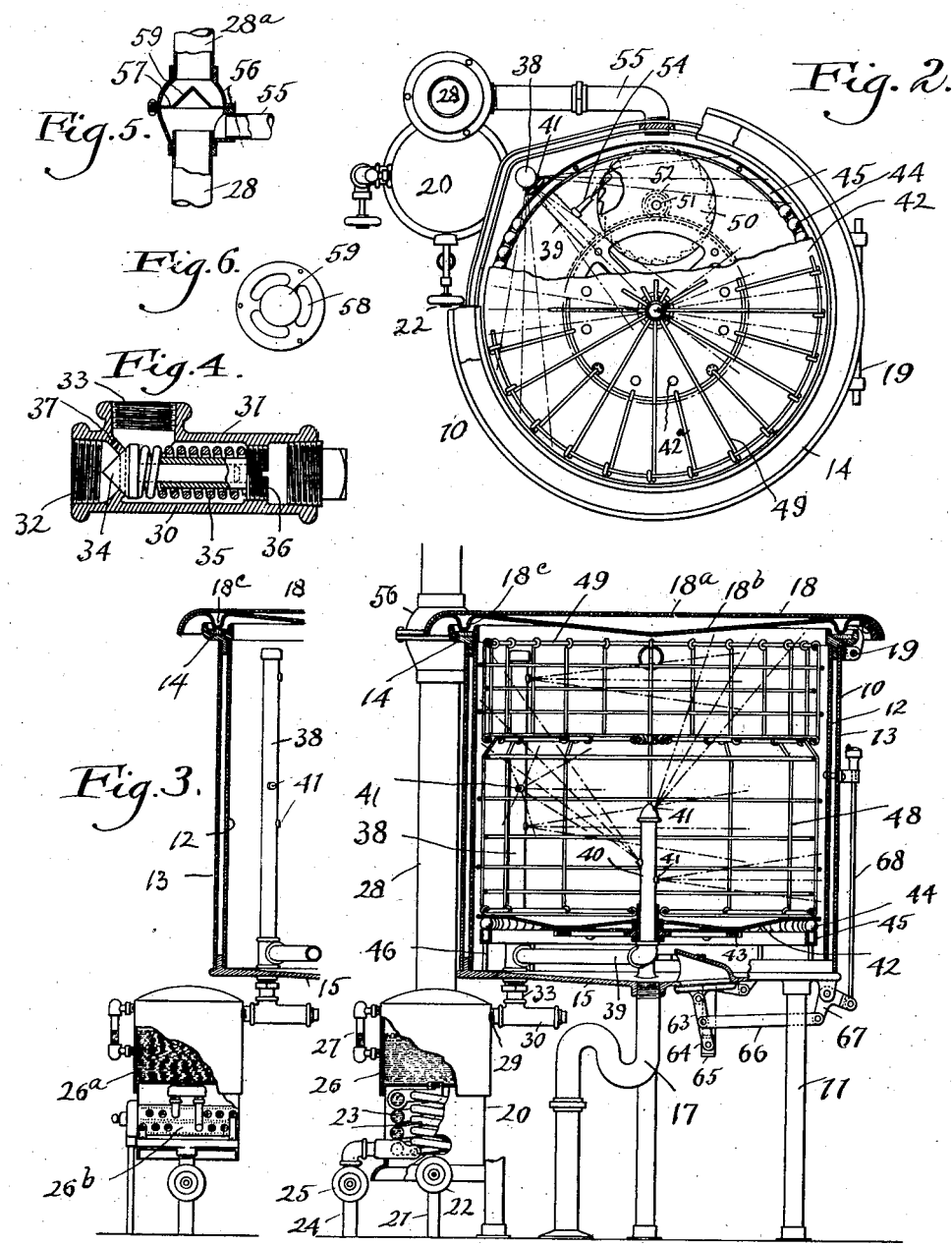

April 15, 1930.  M. G. CLARK ET AL  1,755,101
DISHWASHER
Filed Dec. 16, 1921  3 Sheets-Sheet 3
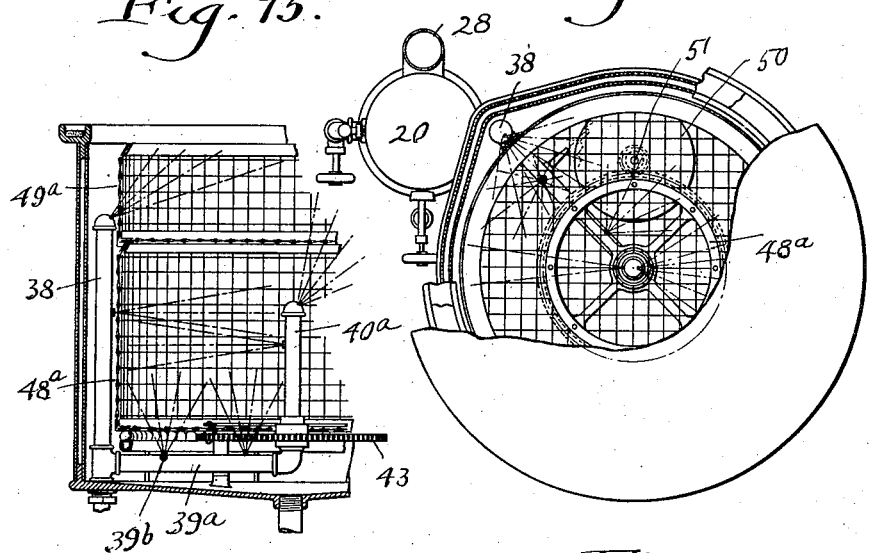
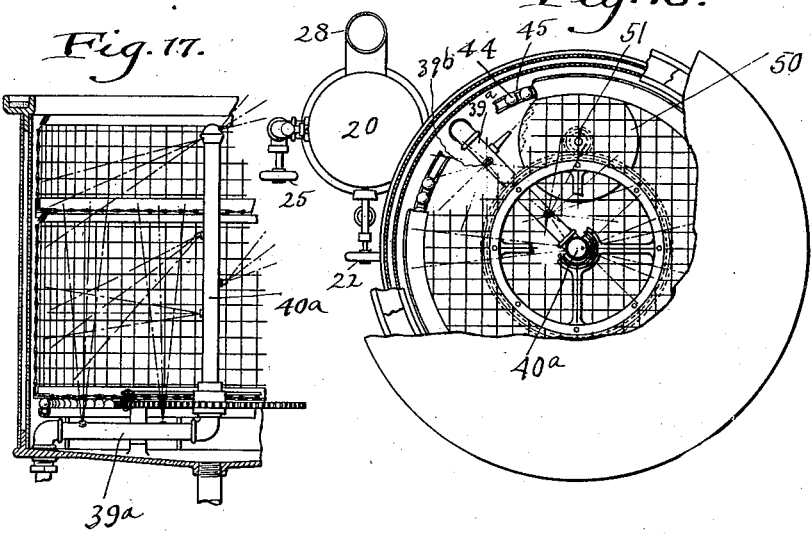

Patented Apr. 15, 1930

1,755,101

UNITED STATES PATENT OFFICE

MILLS G. CLARK, OF EAST CLEVELAND, AND WILLIAM G. FORDING, OF LAKEWOOD, OHIO

DISHWASHER

Application filed December 16, 1921. Serial No. 522,794.

This invention relates to a dish washer, and has for its chief object to provide a dish washer which is efficient, satisfactory in operation, and inexpensive to produce.

Further the invention aims to provide a dish washer which is suitable for washing, sterilizing and drying dishes, which can be operated at low cost, and wherein the parts are so constructed that they are readily removable for applying or removing dishes, or for cleansing purposes.

The dish washer embodying our invention is preferably constructed to utilize steam for the washing medium. The construction which we have provided is such that the steam is thrown in the form of jets onto the dishes contained in one or more baskets which are slowly rotated during the cleaning operation, steam also being utilized to bring about the rotation as well as the cleansing.

With the washer proper we contemplate using a generator wherein steam can be developed in a short space of time, and it is a feature of the invention that when the steam pressure rises to the desired point, the steam is released from the generator and is led into the washer so as to perform the rotating and cleansing operations.

It is another feature of great importance that while the steam is being generated and pressure is being built up to that point necessary to operate the machine, there is a constant supply of a small amount of steam to the washing chamber, so that the temperature of the articles to be washed or cleansed will be gradually built up to substantially the temperature of the steam which is subsequently supplied for cleansing purposes so as to avoid danger of breakage.

Other features reside in certain details including the means for bringing about more or less rapid condensing or driving off of the steam after the cleansing operation, and numerous other details of construction and arrangement which will be described in the specification and set forth in the appended claims.

In the accompanying sheets of drawings wherein we have shown certain slightly different embodiments of the invention, Fig. 1 is a vertical sectional view of one form of dish washer in which our invention is embodied; Fig. 2 is a top plan view of the same with the cover removed and certain parts broken away; Fig. 3 is a fragmentary view showing a modification in the form of the steam generator; Fig. 4 is a sectional view of a regulator which is employed between the washer proper and generator to control the steam until proper pressure has been built up; Fig. 5 is a detail sectional view of the outlet for the heater and also for the exhaust of steam from the casing of the washer, including provision for the return of water from the condensation of the steam; Fig. 6 is a detail plan view of a feature utilized in Fig. 5; Fig. 7 is a sectional view showing particularly the gearing for rotating the baskets; Fig. 8 is an enlarged fragmentary sectional view showing the propeller which is actuated by steam to rotate the baskets; Fig. 9 is a fragmentary plan view of the same to illustrate pockets of the propeller; Fig. 10 is a fragmentary sectional view of the bottom of the washer, showing a door, and the means for operating the same to bring about condensation or removal of steam from the washing chamber or casing after the cleansing operation; Fig. 11 is a sectional view substantially along the line 11—11 of Fig. 10; Figs. 12 and 13 are detail sectional views on an enlarged scale, showing the manner in which the baskets are rotatably supported; Fig. 14 is a vertical sectional view of a portion of the casing with the central part removed, showing the manner in which it is constructed, and the manner of securing together the parts thereof; Figs. 15 and 16 are respectively a partial vertical sectional view and a top plan view with parts broken away, showing a modification; and Figs. 17 and 18 are views corresponding to Figs. 15 and 16, showing a further slight modification.

Referring first to Figs. 1 to 14, shown on Sheets 1 and 2 of the drawings, it will be observed that the washer includes a stationary casing 10 which is cylindrical or substantially cylindrical, and is adapted to be supported from the floor or other suitable means by legs 11. To minimize loss of heat by radiation we preferably form the body of the casing of inner and outer walls 12 and 13, both of which are formed from sheet metal. At the top of these walls there is an iron annulus 14 having a flange extending down between the walls. At the bottom of the casing there is a cast iron bottom member 15 having an upturned flange which is fitted in between the two walls 12 and 13. The walls 12 and 13, the top casting 14 and bottom casting 15 are preferably drawn and held together by bolts 16, which as shown in Fig. 14 are threaded into tapped openings of the top casting 14 and extend through the upturned flange and marginal portion of the bottom casting 15, where tightening nuts are provided.

It will be observed that the bottom casting 15 slopes down toward the center, and at the center it is connected to a suitable drain pipe 17. Likewise, it will be observed that the top casting 14 is substantially trough-shaped, and that the top of the casing is closed by a cover 18, also preferably formed of two thicknesses of metal 18ᵃ and 18ᵇ which are spaced apart, and the inner piece or wall 18ᵇ of which slopes down toward the center so that the water collected on the cover by the condensation of steam will flow toward the center of the cover and drop down into the receptacle or chamber formed by the casing.

Near the margin of the cover the latter is provided with a down-turned flange 18ᶜ which rests on a suitable packing or gasket in the trough of the upper casting 14, as clearly shown in Fig. 1, and outside this flange the cover is preferably curved downwardly so as to substantially enclose the top casting 14.

Preferably the cover 18 is hinged to the upper part of the body of the casing, the hinge being indicated at 19 in Figs. 1 and 2. No special means need be provided for clamping the cover down against the top of the receptacle or casing proper, though such clamping means may be employed if desired. However, inasmuch as there is a constant outlet for the steam which is discharged into the casing, the pressure never builds up in the casing so that gravity alone can be relied on to hold the cover in place.

It will be noted that the cover is imperforate and that the top is flat, this construction therefore permitting the top of the washer to be employed if desired as a table or support for any articles when the washer is not being used, the height of the washer as it is actually installed permitting this double use.

As before stated, steam is preferably used as the cleansing medium, and to this end we employ in conjunction with the washer, a suitable steam generator.

In Fig. 1 we have shown at 20 a steam generator which is designed to be heated by gas supplied through a pipe indicated at 21 and controlled by a suitable valve indicated at 22. While the details of this steam generator form no part of our invention, as here shown it is provided with coils 23, to which water is supplied by a pipe 24 controlled by a valve 25. Above the coils is a steam and water compartment 26 constituting the boiler proper, the same having a gauge glass, shown at 27. With a gas heated generator it is preferably provided with an outlet pipe 28 for the fumes.

From the top of the upper compartment 26 of the generator there is a steam outlet 29 to which is connected a regulator 30, a detail of which is shown in Fig. 4. This regulator includes a casing 31 having an inlet 32 and an outlet 33. Likewise it has a seat for a cone-shaped plunger valve 34, which is normally held against the seat by a spring 35. The plunger of the valve slides in a sleeve which the spring 35 surrounds, this sleeve having a head 36 which is screwed into the casing and can be adjusted to vary the tension of the spring and therefore the amount of steam pressure which must be built up in the generator before the steam is supplied to the casing of the washer proper for cleansing purposes. It will be noted at this point that the regulator has a small port 37 which by-passes the valve 34, allowing a small amount of steam to escape from the inlet to the outlet.

The outlet 33 of the regulator has connected to it a vertical steam discharge pipe 38 which extends up through the bottom 15 of the casing, as clearly indicated in Figs. 1, 2 and 3. Just above the bottom 15 there is a branch 39 extending laterally to the center of the casing, and to this branch is connected a central vertical steam discharge pipe 40. Both vertical pipes 38 and 40 have nozzles or outlets indicated at 41 by which the steam is designed to be directed at various angles onto the dishes to be washed, the nozzles from the outer vertical pipe 38 directing the steam in a general direction inward, but at various angles, while the nozzles or outlets of the central pipe 40 direct the steam at various angles toward the upright wall of the casing and toward the top, as indicated clearly in Figs. 1 and 2.

Rotatably mounted on the central vertical pipe 40 and near the bottom thereof, is a plate or platform 42, to the bottom of which is riveted or otherwise secured a gear 43 (see Fig. 7). The gear and platform 42 are designed to rotate upon a bushing surrounding the lower part of the vertical central pipe 40, and they are partially supported at this point. Likewise the outer part of the platform is supported on an annular series of anti-friction balls 44, carried by a U-shaped trough 45 (see particularly Figs. 12 and 13), supported at intervals by pins 46, which rest upon the bottom 15 of the casing near its outer periphery. The trough 45 has a series of openings so that water may readily drain therefrom, one of these openings being shown at 47 in Fig. 13. The balls 44 are formed of material which will not rust, and preferably glass balls are utilized.

Preferably the dishes to be cleansed are contained in a basket, and generally two baskets, two baskets being shown in the drawing, the lower basket being designated 48 and the upper basket being designated 49. As here shown, the lower basket is somewhat larger than the upper one, and it rests direct on the lower rotating plate or platform 42, while the upper basket is designed to rest on the top of the lower basket. We contemplate placing in the lower basket, the dishes or utensils of relatively large size, and in the upper basket the relatively small dishes or utensils, such as knives, forks, cups and the like.

It should be noted at this point that both baskets are supported on the lower rotatable platform 42 so that they will be rotated when the platform is rotated.

In the construction shown in Figs. 1 and 2 wherein the rotary platform 42 is utilized, the bottoms of both baskets are preferably formed of wires, part arranged radially, and part circular, as shown in Fig. 2, and at the center of the bottom of the lower basket there is a suitable opening so that the lower basket can be set down on the platform over the upstanding central pipe 40. Generally it will not be necessary to remove the lower basket, though it can be removed or lifted out through the casing if desired, but in practice the dishes to be cleansed are placed in the basket while it is in operative position, and are lifted out of the basket without removing the latter from the casing. On the other hand, the upper basket is lifted out to permit the insertion or removal of dishes from the lower basket, and the upper basket can be filled in the casing or out of it, as may be found most convenient.

It will be observed in passing, that the outer vertical steam pipe 38 is just outside the baskets and outside of the trough 45 carrying the balls on which the lower rotary platform is mounted.

For the purpose of rotating the baskets, and in the construction shown in Figs. 1 and 2, also the lower platform 42, we provide between the platform 42 and the bottom 15 of the casing, and at one side of the center of the latter, a propeller which is indicated at 50, and which is journaled on a pin 51 supported by the bottom casting 15 (see particularly Fig. 7). Secured to the top of this propeller is a pinion 52 which meshes with the gear 43 at the bottom of the lower rotary platform 42. It will be observed by reference to Figs. 8 and 9, that this propeller is provided at its periphery with pockets 53.

As before stated, steam is utilized to rotate the propeller and to bring this about the branch steam pipe 39 which lies just above the bottom 15 of the casing is provided with a laterally extending nozzle 54 (see particularly Fig. 2). This nozzle is so disposed with reference to the periphery or pockets of the propeller 50, that when steam is discharged into the casing of the washer it is forcibly directed into the pockets of the propeller and rotates the propeller, and inasmuch as the propeller is geared to the support for the baskets, the latter are slowly rotated while the steam is being directed onto the dishes in the baskets.

It might be stated at this point that the platform 42 is somewhat trough-shaped, and at the lower part there are outlets indicated at 42$^a$ so that the water may readily drain therefrom.

It will be observed that connected to the upper part of the casing there is a steam outlet pipe 55 which may convey the steam to any suitable point, but inasmuch as we have shown in Figs. 1 and 2 a steam generator heated by gas and having an outlet pipe 28 for the fumes, this steam exhaust pipe 55 is connected to the pipe 28, but a special construction is provided at the point of connection to provide for the return of hot water derived from the condensation of the steam. It will be observed by reference to Fig. 5, that the pipe 55 discharges into a chamber 56, which is connected in the pipe 28, and that this chamber carries a partition 57, having openings 58, and at the center an upstanding cone 59. With this construction any steam that condenses above the partition 59 will flow down the upper section 28$^a$ of the pipe 28 and will be deflected by the cone to the side of the lower section of the pipe 28 shown in Fig. 5, and will flow back by way of the pipe 55 into the washer, and will eventually leave the latter by the drain 17.

One other feature yet remains to be explained, and that is the means for removing the steam from the washer after the cleansing operation and after the flow of the steam has been stopped. To bring about this removal of the steam we provide in the bottom casting 15 an opening 60 which is covered by a hood 61 on the inside of the bottom casting to prevent the flow of water out through this opening. This opening 60 is normally tightly closed by a door 62 hinged on the lower side of the bottom casting 15. To permit the opening and closing of this door, and to cause the door to tightly seal the opening when the door is in closed position, we provide for the closing and opening of the door a pair of toggle links 63 and 64, pivoted respectively to the door and to a bracket 65 secured to the lower side of the bottom casting 15. To the connecting point of these links we connect a link 66, the outer end of this link being connected to one arm of a bell crank 67, to the other arm of which is connected a rod 68 extending up alongside the casing of the washer.

It will be observed that when the rod is pushed downward, the door is closed and the opening 60 is sealed, but when the rod is pulled upward the door is swung downward. As the door is lowered or opened, the steam will be either condensed in the washer or will be driven out through the outlet pipe 55.

Before describing the operation we will refer to the modification shown in Figs. 15, 16, 17 and 18.

The construction shown in Figs. 15 and 16 is practically identical with that first described, but in this instance the bottom of the lower rotary plate or platform 42 is eliminated and the gear 43 is secured direct to the bottom of the lower basket, which is here designated 48ª, the upper basket being designated 49ª. In this instance both baskets are preferably formed of wire mesh which is indicated in Figs. 15 and 16. By eliminating the lower platform 42 from the construction shown in Figs. 1 and 2, the branch steam pipe, here designated 39ª, may have steam outlets or nozzles designated 39ᵇ, so that the steam can be directed upwardly through the dishes in the rotating baskets as well as laterally.

The construction shown in Figs. 17 and 18 is like that shown in Figs. 15 and 16, except that in this construction we have omitted the outer upstanding steam delivery pipe 38, and the central steam delivery pipe, here designated 40ª, is extended up to near the top of the casing, i. e. through both baskets. With this construction the steam is projected upwardly from the branch pipe 39ª, and laterally from the central delivery pipe 40ª only.

By eliminating the outer upright steam delivery pipe 38, the upright wall of the casing can be made absolutely circular, and therefore somewhat cheaper than the casing shown in Figs. 1 and 2, and 15 and 16, the casing shown in these figures having a lateral offset to accommodate the pipe 38.

In other respects, the construction shown in Figs. 15 to 18 is like that first described.

Although a steam generator is an important part of our improved washer, i. e. forms an important adjunct thereto, the details of the generator are, as before stated, immaterial to our invention, and whereas in Fig. 1 we have shown a generator heated by gas, a gas heated generator is not necessary, and in Fig. 3 we have shown a generator designated 26ª, which is heated electrically, the heating element and the coils which extend therethrough being designated as a whole by the reference character 26ᵇ. As the details of this particular generator likewise constitute no part of the present invention, further description will not be necessary, this type of generator being shown to make clear the fact that we contemplate other than gas heated steam generators. In fact, in some instances the steam generator may be omitted entirely, as when there is available a separate source of steam. Usually, however, a steam generator will form a part of the washing machine.

In operation, the operator will turn the water valve 25 until the water fills the upper compartment of the generator to about the level shown in Figs. 1 and 3, the level being determinable by the gauge glass. Then the operator will turn on and light the gas, if a gas heated generator is employed, or turn on the current if an electric generator is employed, etc. The steam will be generated to a pressure for cleansing in a very few minutes, and while this is occurring, the operator may load the washer with the dishes, if he has not already done so. No great amount of steam will pass into the washer until the steam in the generator has reached the predetermined pressure determined by the adjustment given to the regulator, but as already stated, a small amount of steam will pass into the washer by way of the port 37, gradually bringing the temperature of the dishes up to substantially the temperature of the steam which is subsequently to be projected onto them for cleaning purposes.

As soon as the pressure builds up to the predetermined point, the cone-shaped head of the regulator is forced back, and steam is delivered into the washer and is projected very effectively onto the dishes by reason of the various steam nozzles or outlets, whether arranged as shown in Figs. 1 and 2, or as shown in Figs. 15 to 18.

At the same time, steam is directed onto the periphery of the propeller and it is rotated, causing the baskets, and therefore the dishes to be slowly rotated, due to the reduction gearing connecting the propeller to the lower basket.

In a short space of time, due to the rotation of the baskets and dishes, and the fact that steam is directed onto them at various angles, the dishes will be thoroughly cleaned and sterilized. After the cleansing operation has been conducted for a sufficient length of time, which the operator can determine by experience, the supply of heat to the generator will be discontinued, shortly after which the passage of steam to the generator ceases. The operator will then open the door at the bottom of the washer and allow the steam to be driven from the washer or to condense, it being understood that during the washing or cleansing operation, the door at the bottom of the washer was closed.

Inasmuch as the dishes were at a high temperature while being cleansed, upon the discontinuance of the supply of steam and a removal of the steam from the washer, the dishes will be dried while cooling, assuming that they were properly placed in the baskets so as not to retain water. It is to be understood that prior to the starting of the washing operation, the dishes may be sprinkled with a powderous or liquid detergent, but whether or not the detergent is used, the dishes are effectively washed or cleansed, and at the same time sterilized and dried in a brief space of time.

After the washing and drying has been completed, the cover will be swung back, the upper basket will be removed, and the operator will remove the dishes from the lower basket, or if he chooses, he can lift the lower basket from the washer.

It might be mentioned in conclusion that all the rotary parts can be readily removed, and the trough supporting the balls can likewise be removed if it should be desired to clean the washer, so as to remove anything which was too large to be removed by passage through the drain 17.

Thus it will be seen that the objects stated at the beginning of the specification are attained by our invention.

Under certain circumstances it may be desirable to use a gaseous fluid other than steam, such, for example as a vapor derived from a liquid other than water, and the word "steam" as used herein, is intended to be inclusive of any other gaseous fluids which may be employed.

We do not desire to be confined to the exact details shown, but aim in our claims to cover all modifications which do not involve a departure from the spirit and scope of our invention in its broadest aspects.

Having described our invention, we claim:

1. In a dish washer, a casing, a source of steam, rotary means within the casing for carrying articles to be washed, means within the casing adapted to be supplied with steam from said source for projecting jets of steam on the articles and for causing the rotation of said rotary means, means for conducting a small flow of steam to the casing for preheating the dishes, and means controlled by the difference in pressure existing between said source and said casing for affording a passage for the free flow of steam to the casing when said difference in pressure reaches a predetermined amount.

2. In a dish washer, a casing, a source of steam, rotary means within the casing for supporting articles to be washed, a propeller for said means, pipes in the casing adapted to receive steam from said source and having outlets for projecting steam against said articles and against the propeller to rotate the same, a flow controlling device between the source and casing for restricting the flow of steam until the steam pressure reaches a predetermined value, and a small by-pass port for by-passing a small amount of steam around said device.

3. In a dish washer, a casing adapted to receive articles to be washed, a steam generator, steam delivery means in the casing connected to the generator, an automatic pressure operated valve between the generator and the steam delivery means, and means forming a by-pass around said valve for the delivery of a relatively small amount of steam when said valve is closed.

4. In a dish washer, a source of steam, a casing adapted to receive articles to be washed, an article carrier within the casing, steam delivery means within the casing and adapted to be connected with said source, a conduit for conducting steam from the casing during the cleansing operation, an opening in the bottom of said casing for expelling and condensing the steam after the cleansing operation, a manually operated pivoted closure member therefor, and a separate outlet or drain for water.

5. In a dish washer of the type wherein dish cleansing is accomplished with steam, a casing, steam delivery means within the casing adapted to be connected to a source of steam, said casing having a bottom normally closed to the outlet of steam, a steam outlet near the top of the casing, and a door in the bottom adapted to be opened to cause the expulsion and condensation of steam after the cleansing operation.

6. In a dish washer, a casing adapted to receive articles to be washed, a source of steam, steam delivery means in the casing connected to said source, a valve for controlling the flow of steam from said source to the steam delivery means, and means forming a by-pass around said valve for the delivery of a relatively small amount of steam when the valve is closed.

7. In combination, a dish washer, a source of steam from which steam is adapted to be supplied to the washer for cleansing purposes, means for conducting a small flow of steam to the washer for preheating the dishes, and means controlled by the difference in pressure existing between said source and said washer for affording a passage for the free flow of steam to the washer when the pressure reaches a predetermined amount.

In testimony whereof, we hereunto affix our signatures.

MILLS G. CLARK.
WILLIAM G. FORDING.